Patented Mar. 2, 1948

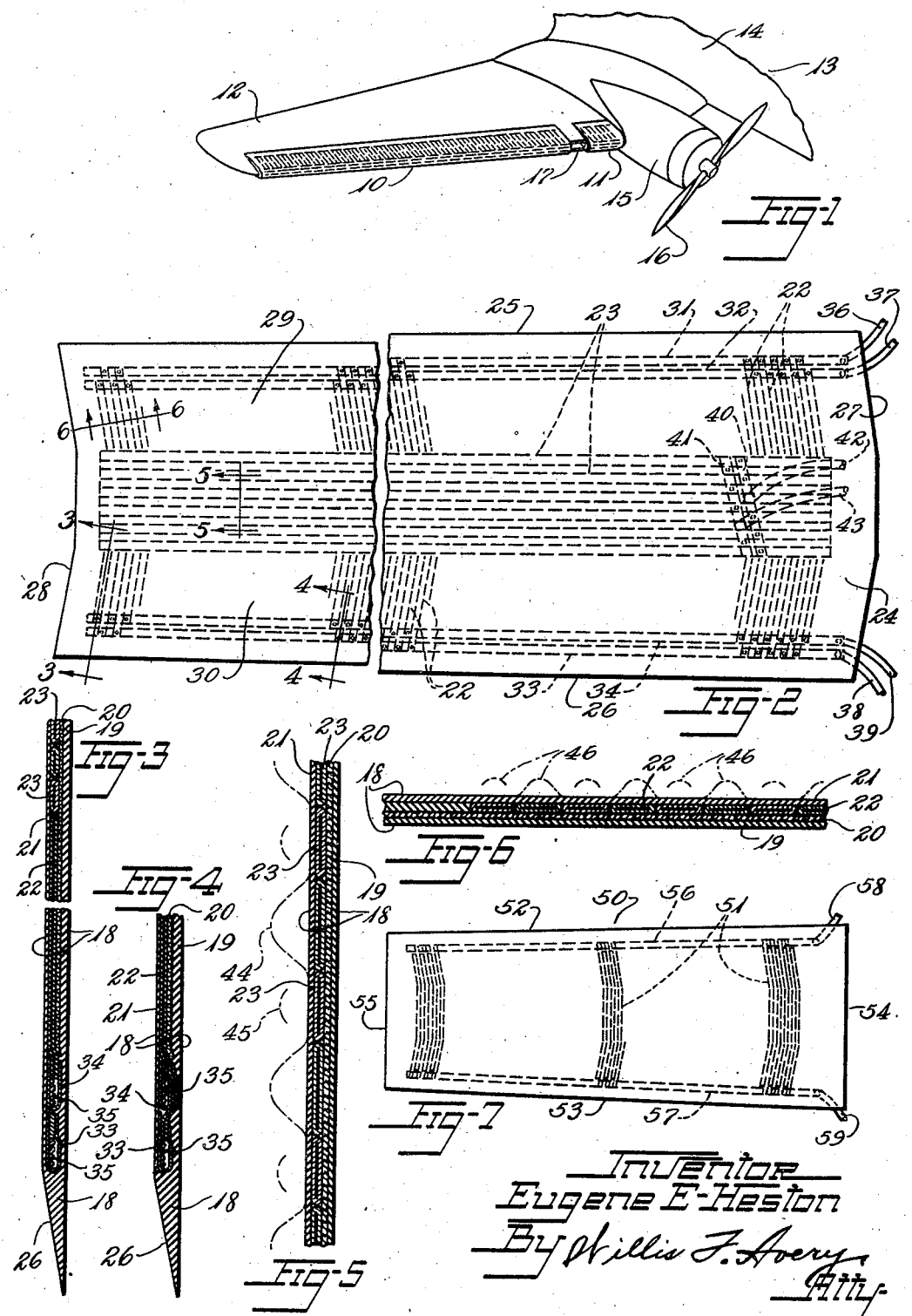
March 2, 1948. E. E. HESTON 2,436,889
PROTECTIVE APPARATUS FOR PREVENTING ACCUMULATION OF ICE ON AIRFOILS
Filed June 9, 1944
Inventor
Eugene E. Heston
By Willis F. Avery
Atty.

2,436,889

UNITED STATES PATENT OFFICE 2,436,889

PROTECTIVE APPARATUS FOR PREVENTING ACCUMULATION OF ICE ON AIRFOILS

Eugene E. Heston, Akron, Ohio, assignor to The B. F. Goodrich Company, New York, N. Y., a corporation of New York Application June 9, 1944, Serial No. 539,442

13 Claims. (Cl. 244—134)

1

This invention relates to protective apparatus for preventing the accumulation of ice on a surface and especially to such apparatus suitable for installation upon airfoils, struts and other parts of aircraft and other structures used in icing conditions.

Prior constructions of inflatable protective apparatus or covering having spanwise tubes of relatively large size, usually about two or three inches in diameter, have not been wholly satisfactory under some icing conditions in preventing objectionable deposits of ice on the leading edges of wings and other airfoils of aircraft. Such coverings have also caused objectionable aerodynamic interference to the smooth flow of air over the wings when such large size tubes are in the inflated condition. Also the prior apparatus have been usually attached to the wings merely along their margins which permitted the lifting of portions of the covering away from the wings at regions of low pressure rearwardly of the leading edges, and have presented the problem of venting beneath the covering to prevent objectionable bulging thereof which is caused by the entrapped air.

Objects of the invention are to provide effectively for preventing the accumulation of ice on the surfaces of airfoils of aircraft and other structures exposed to icing conditions and especially to provide for breaking the bond of types of ice which heretofore have been difficult to remove; to provide for maintaining the desired aerodynamic characteristics of such airfoils and other structures; and to provide simplicity of construction, lightweight and thinness of structure, convenience of manufacture and installation, and effectiveness of operation.

Other objects of the invention are to provide for a configuration of surface deformations in the covering for breaking the bond of the ice-deposit thereon throughout a wide variety of icing conditions; to provide for deforming the surface of such covering substantially throughout the whole extent of the covering; to provide for preventing the entrapment of air beneath the covering and the lifting of the covering away from the airfoil or other structure at regions of low pressure; and to provide for deforming the covering only in the outward direction relative to the surface of the airfoil or other structure.

More specific objects of the invention are to provide for distending the surface of the covering into small, sharply curved ridges in the spanwise direction or the chordwise direction or both directions; to provide a covering having a multi-

2 plicity of inflatable passages therein disposed in closely adjacent parallel relation; and to provide for securing the covering to the airfoil or other structure by adhesion substantially throughout the whole extent of such covering.

These and other objects and advantages of the invention will be apparent from the following description.

In the accompanying drawings which form a part of this specification, and in which like numerals are employed to designate like parts throughout the same, Fig. 1 is a perspective frontal view from above of apparatus or protective coverings mounted upon the leading edge of a wing of an aircraft and constructed in accordance with and embodying the invention, parts being broken away, Fig. 2 is a plan view from above of the covering before being mounted on the wing, Fig. 3 is a sectional view of the covering taken along line 3—3 of Fig. 2, Fig. 4 is a view like Fig. 3 taken along line 4—4 of Fig. 2, Fig. 5 is a view like Fig. 3 taken along line 5—5 of Fig. 2, Fig. 6 is a view like Fig. 3 taken along line 6—6 of Fig. 2, and Fig. 7 is a view like Fig. 2 but showing a modified construction of the covering.

In the illustrative form of the invention shown in the drawings, protective coverings 10 and 11 are adapted to be mounted upon the leading edge of a wing 12 of an aircraft 13, the wing being attached to a fuselage 14 and having an engine nacelle 15, a propeller 16 and a landing light 17 or other structure at such leading edge. The other wing and other airfoils, stabilizers, and struts, and other elements of the aircraft may be similarly provided, as desired. Each of the coverings 10 and 11 are alike in their construction and arrangement except as to their spanwise extent; hence only the features of the covering 10 will be described in detail.

The covering 10 includes a body 18 of resilient rubber or other rubber-like material which may have embedded therein adjacent the inner supporting face 19 of the covering, a reinforcement 20 of suitable textile material such, for example, as woven fabric of cotton, linen, rayon or other suitable material, straight laid or bias laid, for strengthening the covering and for preventing objectionable stretching of the same. Also included in the body 18 of the covering adjacent the outer stretchable face 21 thereof, are a multiplicity of inflatable passages or tubes 22, 23 of small diameter arranged in closely adjacent parallel relation substantially throughout their extent, which passages, when inflated, distend outwardly the outer stretchable face 21 of the covering 10 into a multiplicity of small ridges of small radius of curvature whereby the bond of the ice deposited thereon is broken effectively. The walls of the tubes 22, 23 being of rubber material may have embedded therein suitable reinforcing material of suitable woven fabric which may be extensible or substantially inextensible or may be cut on the bias to give a slight extensibility, if desired.

The tubes 22, 23 may be disposed to extend wholly in the chordwise direction as shown especially in Fig. 7, or wholly in the spanwise direction, or may be disposed in part chordwise and in part spanwise in any suitable arrangement thereof for obtaining the desired washboard-like surface-configuration of the covering as shown especially in Figs. 5 and 6, while maintaining the desired aerodynamic characteristics of the airfoil or wing.

Whereas inflation tubes of prior constructions have been relatively large in size and have not been as effective as desired to remove ice under some conditions, as where the ice is strongly adhered to the covering surface at low temperatures, the tubes of the construction herein described are relatively small and are effective to break the bond of the ice to the surface in cases where the prior constructions have lacked full effectiveness. The success of the improved construction in breaking the strong bond of the ice results at least in part apparently from the relatively small radius of curvature of the tubes, causing a sufficiently sharp change of contour in the inflating operation and a sufficiently severe and concentrated disrupting force on the adhered ice. Also, the smallness of the tubes permits them to be arranged close together so that a number of tubes are operative on a small zone of ice, and diverse directions of the disrupting forces are obtained on a small area of ice spanning adjacent tubes.

As to the size of the tubes effective to produce the improved ice-removing action, excellent results have been obtained in constructions where the diameter of the tube passage has been on the order of a quarter of an inch, although good results have been obtained also with tubes up to about three-quarters of an inch in diameter. Tube sizes greater than this have shown appreciably less effectiveness in removing strongly bonded ice in some cases.

The improved action of constructions utilizing the small tubes is noticeable especially in cases where the strongly adhered ice is deposited in a thin layer upon the surface of the covering. Whereas larger tubes often have not demonstrated complete removal of such thin ice, and have required many inflations to break the bond of such ice, the small tubes have shown effectiveness in breaking the adhesion of and removing the thin ice promptly. This is advantageous especially where aerodynamic cleanliness is desired at all times and it is desired to avoid letting the ice build up to greater thickness for easier breakage and removal.

The tubes may be uniform or varied as to size within the above designated range in any suitable manner such, for example, as being of uniform diameter throughout the extent of the covering or throughout a portion of the latter, or alternate tubes being of greater or lesser diameter than that of the adjacent tubes, or the tubes in one portion of the covering being of a different diameter than that of the tubes in another portion thereof.

In the construction shown especially in Figs. 1 to 6, inclusive, the covering 10 is shaped to accommodate the taper and the sweepback of the wing 12. The covering has a multiplicity of relatively small inflatable tubes, less than about three-quarters of an inch in diameter, and disposed in closely adjacent parallel relation, a part of the tubes 23 extending in the spanwise direction in a portion 24 intermediate upper and lower margins 25 and 26, respectively, of the covering and extending substantially to inboard and outboard end margins 27 and 28, respectively, of such covering. The covering 10 also has a part of the tubes 22 extending in the chordwise direction in rearward portions 29 and 30 of the covering and extending from the spanwise tubes 23 to substantially the upper and lower margins 25 and 26.

Each of the chordwise tubes 22 in the upper and the lower rearward portions 29 and 30 is less than about three-quarters of an inch in diameter and may be about one-quarter of an inch in diameter. For inflating purposes and to obtain the desired rocking action, the numerous small chordwise tubes in the upper and the lower rearward portions 29 and 30 are grouped into independent series, each series comprising alternate tubes in communication, desirably at one of their ends, with an inflating manifold or conduit 31, 32, 33, 34 extending in the spanwise direction as shown especially in Figs. 2, 3 and 4, the manifolds 31 to 34 being disposed adjacent the margins 25 and 26 of the covering. Each manifold may be provided with a grooved inner surface 35 for admitting air when the manifold is in the collapsed condition, and each manifold is connected desirably at its inboard end to a supply conduit 36, 37, 38, 39 in communication with a source of air under pressure in the fuselage 14, for example.

This construction and arrangement makes possible effectively breaking the bond of the ice deposited on such portions 29 and 30 of the covering and lifting the broken and loosened pieces of ice away from the covering by virtue of the distending and rocking actions of the tubes even though the ice be very thin and tough, and facilitates removal of the loosened pieces of ice thereon by the scavenging action of the rapid laminar flow of air to the rear of the stagnation point at the leading edge of the wing, and in addition results in little or no aerodynamic disturbance to the flow of air across the wing since the chordwise tubes are substantially parallel to the direction of such flow. Ice-deposits of greater thickness are also loosened and removed thoroughly and promptly from the rearward portions 29 and 30 by the distending, stretching and rocking actions of the chordwise tubes and the flow of air thereover.

Since the ice deposited on the covering may be relatively thick and cap-like in form in the region of the stagnation point at the leading edge of the airfoil while being thinner at rearward positions, spanwise tubes 23 of somewhat larger diameter than the chordwise tubes may be provided for breaking the bond of the ice-cap and such spanwise tubes are disposed in the intermediate portion 24 of the covering. The alternate spanwise tubes 23 may be less than about three-quarters of an inch in diameter and the adjacent spanwise tubes 23 may be of a lesser diameter, although all such relatively small spanwise tubes 23 may be uniform in diameter within the range of sizes noted hereinabove. For providing the desired rocking action and for inflating purposes, the tubes 23 may also be grouped into independent series, the relatively larger diameter tubes being at their inboard ends in communication with an inflating manifold or conduit 40 extending chordwise and the smaller diameter tubes being similarly in communication with an inflating manifold or conduit 41 also extending chordwise. The manifolds 40 and 41 may be provided with a grooved inner surface like the other manifolds 31 to 34 and are connected to supply conduits 42 and 43 also in communication with the source of air under pressure. When the spanwise tubes 23 are inflated, they distend the outer stretchable face 21 of the covering into ridges of small radius of curvature substantially normal to the chordwise curvature of the leading edge of the airfoil thereby effectively breaking the bond of the ice-cap and lifting and rocking the latter for removal by the action of the flow of ambient air.

The fabric and rubber parts of the covering 10 are preferably united by vulcanization under pressure. The respective margins 25, 26, 27 and 28 of the covering may be tapered in section for promoting smooth flow of air over the covering, as shown especially in Figs. 3 and 4.

The covering 10 is attached to the leading edge of the airfoil or wing 12 by being adhered to such wing continuously throughout the extent of the covering by a suitable adhesive such, for example, as rubber cement. Such a mounting arrangement has the advantages of permitting substantially only outward expansion of the inflatable tubes for distending and stretching the outer stretchable face of the covering into the multiplicity of ridges and of eliminating objectionable lifting of the covering from the airfoil at regions of low pressure rearwardly of the leading edge. The necessity for additional attaching structures such as metal reinforcing beads and fairing strips at the margins and for venting entrapped air from the space beneath the covering are also obviated, hence simplifying the construction of such covering and facilitating providing light-weight and thinness of the structures of the covering.

For inflating the relatively small passages or tubes, an air pressure of about fifteen pounds per square inch has been found to be satisfactory, although other suitable pressures, higher or lower may be used. In cyclically operating the protective covering 10, the spanwise tubes 23 are inflated first in the cycle and the chordwise tubes 22 are inflated next in the cycle. For one complete cycle of operation, for example, each of the independent series of spanwise tubes 23 is inflated alternately in a cyclical manner by admitting and exhausting the air under pressure to and from the respective manifolds 40 and 41 through the respective supply conduits 42 and 43. Then each of the corresponding pairs of independent series of chordwise tubes 22 in the upper and the lower rearward portions 29 and 30 is next inflated alternately in a cyclical manner by admitting and exhausting the air under pressure to and from the respective pairs of manifolds 31 and 33, 32 and 34 through the several pairs of supply conduits 36 and 38, 37 and 39, thereby completing one cycle of operation of the covering. In this manner the outer surface of the covering is distended outwardly and stretched into a multiplicity of spanwise and chordwise ridges of small radius of curvature substantially throughout the whole extent of the covering including the intermediate portion 24 and the rearward portions 29 and 30 respectively, as shown especially by broken lines at 44 and 45 in Fig. 5 and broken lines 46 in Fig. 6, thereby breaking effectively the bond of the ice deposited on such surface of the covering and rocking the pieces of ice on closely adjacent portions of the covering and thereby facilitating the thorough and prompt removal of the loosened ice by the flow of air across the leading edge of the wing.

Since the inflatable tubes are all of relatively small size and since the chordwise tubes are disposed in the direction of laminar flow of air to the rear of the stagnation point, the arrangement results in low aerodnyamic disturbance to the flow of air across the wing thus maintaining the desired aerodynamic characteristics of such wing. Furthermore, since the covering is adhered to the wing throughout the whole extent of such covering, objectionable bulging and lifting away of the covering at regions of low pressure is effectively prevented which further facilitates maintaining the desired aerodynamic characteristics of the wing; and such attachment of the covering to the wing also eleminates and effectively solves the difficult problem of venting the space between such covering and wing. A further advantage results from such an adhesive mounting of the covering in that such covering need not be in a condition of stretch between attaching margins to prevent bulging and lifting and thus additional reinforcing means and fairing strips at the attaching margins are not required, resulting in a substantial saving in weight and simplified construction of the covering.

The modified construction 50 of the covering shown especially in Fig. 7 is like the construction of the covering 10 except that all relatively small inflatable passages or tubes 51 therein of less than about three-quarters of an inch in diameter and which may be about one-quarter of an inch in diameter, are disposed wholly in the chordwise direction in closely adjacent parallel relation. The multiplicity of chordwise tubes 51 extend continuously between upper and lower margins 52 and 53, respectively, and substantially from inboard to outboard end margins 54 and 55, respectively. For inflating purposes and to obtain the desired rocking action, the numerous small tubes 51 are grouped into independent series, each series comprising alternate tubes in communication, desirably at one of their ends, with an inflating manifold or conduit 56, 57. The manifolds 56 and 57 may be disposed spanwise along the opposite margins 52 and 53 of the covering. Each manifold may be provided with a grooved inner surface like that of the surface 35 of the manifold 31, for example, of the covering 10; and each manifold 56, 57 is connected desirably at its inboard end to a supply conduit 58, 59 in communication with a suitable source of air under pressure. The covering 50 may be shaped to accommodate the taper and sweepback of the wing. The fabric and rubber parts of the covering 50 are preferably united by vulcanization under pressure. The covering 50 is adhered to the leading edge of the airfoil continuously throughout the extent of such covering by means of a suitable adhesive.

In the operation of the covering 50, each of the independent series of chordwise tubes 51 is inflated in alternation with the other series of such tubes by admitting and exhausting the air under pressure to and from the respective manifolds 56 and 57 through the respective supply conduits 58 and 59. In this manner the surface of the covering 50 is distended outwardly and stretched into a multiplicity of chordwise ridges of relatively small radius of curvature thereby breaking effectively the bond of the ice deposited thereon and imparting the desired rocking action to the broken ice and thereby facilitating the removal of the loosened ice by the laminar flow of air across the airfoil. The chordwise arrangement of the small tubes 51 facilitates the scavenging action of the laminar flow of air to the rear of the stagnation point of the leading edge for removing the loosened ice and makes possible maintaining the desired aerodynamic characteristics of the airfoil because of low disturbance to such laminar airflow.

Variations may be made without departing from the scope of the invention as it is defined in the following claims.

I claim:

1. Apparatus for preventing the accumulation of ice on the leading edge of an airfoil, said apparatus comprising a covering of resilient rubber-like material for said leading edge, said covering comprising tubular passages therein extending in the spanwise direction and disposed intermediate the chordwise extent of said covering and comprising a multiplicity of tubular passages therein extending in the chordwise direction from the spanwise tubular passages, the chordwise tubular passages being disposed such that adjacent margins of adjacent passages are in closely adjacent parallel relation to one another throughout their extent and the space between said adjacent margins being a small fraction of the width of one of such adjacent passages, and means for inflating said passages to distend the surface of said covering into spanwise ridges, each spanwise ridge and each chordwise ridge being coextensive with its associated passage and each passage being effective for ice-removal purposes, the size and positioning of said chordwise tubular passages being such as to provide, upon inflation of said chordwise passages, a washboard-like surface configuration having a multiplicity of closely-adjacent chordwise ridges of small radius-of-curvature in-section, whereby localized rupturing and stretching forces in diverse directions at a multiplicity of closely-spaced positions coincidental with and across said chordwise passages are imparted to ice deposited on the covering to effect severing the bond of adhesion between said ice and said covering and to effect lifting and breaking the ice into small pieces for facilitating removal of the broken ice by the flow of air across the covering.

2. Apparatus for preventing the accumulation of ice on the leading edge of an airfoil, said apparatus comprising a covering of resilient rubber-like material for said leading edge, said covering comprising a multiplicity of tubular passages therein disposed in closely adjacent parallel relation substantially throughout their extent, each passage being of substantially uniform bore throughout its extent and the space between alternate passages being substantially the width of one of such alternate passages, a part of said passages extending in the spanwise direction intermediate the chordwise extent of said covering and a part of said passages extending in the chordwise direction from the spanwise passages, and means for inflating said passages to distend the surface of said covering into a multiplicity of spanwise and chordwise ridges for breaking the bond of ice deposited thereon, each ridge being coextensive with its associated passage and each passage being effective for ice-removal purposes.

3. Apparatus for preventing the accumulation of ice on the leading edge of an airfoil, said apparatus comprising a covering of resilient rubber-like material for said leading edge, a multiplicity of inflatable tubes of small substantially uniform diameter in said covering and disposed in closely adjacent parallel relation, a part of said tubes having adjacent margins substantially adjoining one another and extending in the spanwise direction in the intermediate region of the covering, and a part of said tubes having adjacent margins substantially adjoining one another and extending in the chordwise direction from the spanwise tubes, one of said parts having tubes each of lesser diameter than that of the tubes of the other part, and means for inflating said tubes to distend the surface of said covering into a multiplicity of ridges of small radius-of-curvature in-section for breaking the bond of ice deposited thereon.

4. Apparatus for preventing the accumulation of ice on the leading edge of an airfoil, said apparatus comprising a covering of resilient rubber-like material for adhesive attachment to said leading edge continuously throughout the extent of the covering, a multiplicity of inflatable tubes of small substantially uniform diameter in said covering and disposed in closely adjacent parallel relation, a part of said tubes having adjacent margins substantially contiguous with one another and extending in the spanwise direction intermediate the chordwise extent of said covering, and a part of said tubes having adjacent margins substantially contiguous with one another and extending in the chordwise direction from the spanwise tubes, the chordwise tubes each being of a lesser diameter than the diameter of said spanwise tubes, and means for inflating said tubes to distend the surface of the covering into a multiplicity of ridges of small radius-of-curvature in-section for breaking the bond of ice deposited thereon, said tubes being distended substantially in the outward direction only relative to said leading edge by virtue of the restraining action of said attachment of the covering to the leading edge thereby promoting said small radius-of-curvature of said ridges for effective ice-removal purposes.

5. Apparatus for preventing the accumulation of ice on the leading edge of an airfoil, said apparatus comprising a covering of resilient rubber-like material for said leading edge, a multiplicity of inflatable tubes in said covering and disposed in closely adjacent parallel relation substantially throughout their extent, a part of said tubes extending in the spanwise direction intermediate the chordwise extent of said covering, the spanwise tubes being less than about three-quarters of an inch in diameter, and a part of said tubes extending in the chordwise direction from said spanwise tubes, the chordwise tubes being about one-quarter of an inch in diameter, and means for inflating said tubes to distend the surface of said covering into a multiplicity of ridges of small radius of curvature for breaking the bond of the ice deposit thereon.

6. Apparatus for preventing the accumulation of ice on a surface, said apparatus comprising a covering of resilient rubber-like material having a multiplicity of inflatable tubular passages therein each not exceeding three-quarters of an inch in diameter, providing under inflation thereof a multiplicity of sharply curved ridges at the surface of said covering as a result of the small cross-section of the passages for breaking the adhesive bond of an overlying ice-deposit, adjacent passages being disposed with their margins directly alongside one another in close parallel relation for effecting the surface action of said sharply curved ridges substantially completely over the group area of said passages.

7. Apparatus for preventing the accumulation of ice on the leading edge of an airfoil, said apparatus comprising a covering of resilient rubber-like material having a multiplicity of inflatable tubular passages therein each of uniform diameter not exceeding three-quarters of an inch throughout its extent, to provide under inflation thereof a multiplicity of sharply curved ridges of uniform cross-section at the surface of said covering for breaking the adhesive bond of an overlying ice-deposit, adjacent passages being disposed with their margins directly alongside one another in close parallel relation for effecting the surface action of said sharply curved ridges substantially completely over the group area of said passages.

8. Apparatus for preventing the accumulation of ice on the leading edge of an airfoil, said apparatus comprising a covering of resilient rubber-like material having a multiplicity of inflatable tubes therein each of uniform diameter not exceeding three-quarters of an inch throughout its extent, to provide under inflation thereof a multiplicity of sharply curved ridges of uniform cross-section at the surface of said covering for breaking the adhesive bond of an overlying ice-deposit, adjacent tubes being disposed with their walls in side-by-side abutting relation for effecting the surface action of said sharply curved ridges substantially completely over the group area of said tubes.

9. Apparatus for preventing the accumulation of ice on the leading edge of an airfoil, said apparatus comprising a covering of resilient rubber-like material having in an intermediate portion thereof a group of inflatable tubular passages extending in the spanwise direction and having another group of inflatable tubular passages extending in the chordwise direction from said intermediate portion toward a margin of the covering, the passages of each group thereof being disposed in side-by-side parallel relation.

10. Apparatus as defined in claim 9 in which the passages of said groups are each of uniform diameter not exceeding three-quarters of an inch, providing under inflation thereof a plurality of sharply curved ridges of uniform cross-section at the surface of said covering for breaking the adhesive bond of an overlying ice-deposit, adjacent passages of the respective groups thereof being disposed with the margins of the passages directly alongside one another in close parallel relation for effecting the surface action of said sharply curved ridges substantially completely over the group area of said passages.

11. Apparatus for preventing the accumulation of ice on the leading edge of an airfoil, said apparatus comprising a covering of resilient rubber-like material having in a central portion thereof a group of inflatable tubular passages extending in the spanwise direction and having a group of inflatable tubular passages at each chordwise side of said central portion extending in the chordwise direction from said central portion toward a margin of the covering, the passages of each group thereof being disposed in side-by-side parallel relation.

12. Apparatus for preventing the accumulation of ice on a surface exposed to ice-forming conditions in airflow, said apparatus comprising a covering of elastic material for said surface including a front portion and a rearward portion and including a plurality of inflatable passages in said covering for distending said covering into a series of ridges, a plurality of passages in said rearward portion being disposed wholly within the latter said portion closely adjacent one another and all such passages in said rearward portion being of less width throughout their lengths than a passage in said front portion of the covering whereby said covering is distensible into ridges closely adjacent one another in said rearward portion and relatively small in said rearward portion as compared to a ridge in said front portion.

13. Apparatus for preventing the accumulation of ice on a surface exposed to ice-forming conditions in airflow, said apparatus comprising a covering of elastic material for said surface including a front portion and a rearward portion and including a plurality of inflatable passages in each of said portions for distending said covering into a series of ridges, said plurality of passages in said rearward portion being wholly disposed within the latter said portion closely adjacent one another and being individually of less width throughout their lengths than each of the passages within said front portion of the covering whereby said covering is distensible into ridges relatively small and closely adjacent one another in said rearward portion as compared to the ridges in said front portion.

EUGENE E. HESTON.

REFERENCES CITED

The following references are of record in the file of this patent:

UNITED STATES PATENTS

| Number | Name | Date |
| --- | --- | --- |
| 1,998,809 | Geer | Apr. 23, 1935 |
| 2,168,012 | Waner | Aug. 1, 1939 |
| 2,173,262 | Monegan et al. | Sept. 19, 1939 |
| 2,327,034 | Geer | Aug. 17, 1943 |